United States Patent [19]

Camens

[11] Patent Number: 4,611,160
[45] Date of Patent: Sep. 9, 1986

[54] CHARGING DEVICE

[75] Inventor: Murray I. C. Camens, Eindhoven, Netherlands

[73] Assignee: U.S. Philips Corporation, New York, N.Y.

[21] Appl. No.: 685,575

[22] Filed: Dec. 24, 1984

[30] Foreign Application Priority Data

Jan. 9, 1984 [NL] Netherlands .......................... 8400065

[51] Int. Cl.⁴ .......................... H02J 7/00; H01M 2/10; H01M 10/46
[52] U.S. Cl. .......................................... 320/2; 320/5; 429/100
[58] Field of Search ......................................... 320/2–5, 320/60; 362/183; 429/7, 9, 96–100

[56] References Cited

U.S. PATENT DOCUMENTS

| | | | |
|---|---|---|---|
| 2,642,520 | 6/1953 | Coolidge et al. | 320/2 X |
| 2,876,410 | 3/1959 | Fry | 320/2 X |
| 3,194,689 | 7/1965 | Deschamps | 320/2 X |
| 3,533,119 | 10/1970 | Dokos | 320/2 X |

Primary Examiner—R. J. Hickey
Attorney, Agent, or Firm—Rolf E. Schneider

[57] ABSTRACT

A device for charging a rechargeable electric power source comprises a first section and a second section capable of being assembled in two positions relative to each other, one of such positions being a rest position and the other of such positions being a charging position, the first section being formed to receive a rechargeable electric power source. Electric components are arranged in the second section as a charging circuit for charging a rechargeable electric power source. Connector pins are provided on the second section for cooperating with an electric mains socket, the connector pins being connected to the electric components of the charging circuit. In the rest position the connector pins are covered by the first section. In the charging position the connector pins are clear of the first section, and the rechargeable electric power source in the first section is electrically connected to the electric components of the charging circuit in the second section. A flexible electrical contact member is arranged in the first section for exerting pressure against the rechargeable electric power source.

7 Claims, 5 Drawing Figures

CHARGING DEVICE

This invention relates to a charging device comprising electric components arranged as a charging circuit for charging a rechargeable electric power source.

Such a device is known from, for example, German Patent application OS No. 2,211,262.

The present invention aims at providing such a device of light-weight and compact construction and is characterized in that the charging device comprises at least two sections which can be assembled in two different positions relative to each other, namely a rest position and a charging position, the first section being adapted to receive at least one rechargeable electric power source and the second section being provided with connector pins which are adapted to co-operate with an electric mains socket and which are connected to components of the charging circuit in the second section, the connector pins being covered by the first section in the rest position and the connector pins being clear of the first section and the rechargeable power source in the first section being in contact with electric components of the charging circuit in the second section in the charging position.

The invention will now be described in more detail with reference to the accompanying drawings in which.

Figure 1:
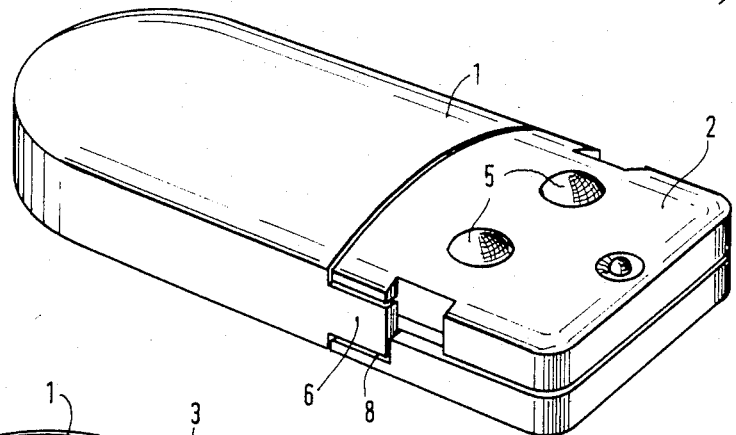
FIG. 1 is a perspective view of a charging device in its closed condition.
Figure 2:
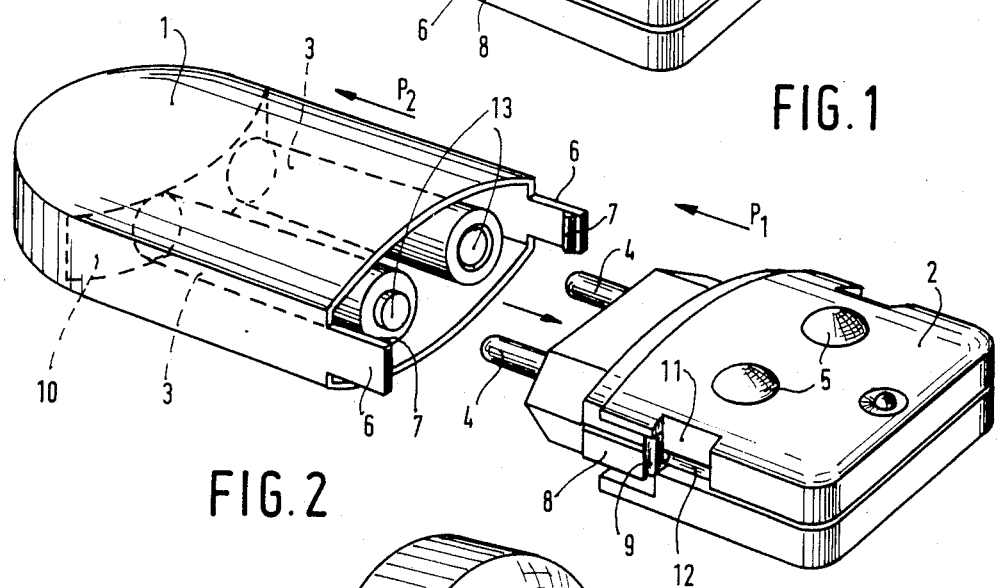
FIG. 2 shows the charging device of FIG. 1 with the two sections separated from each other.
Figure 3:
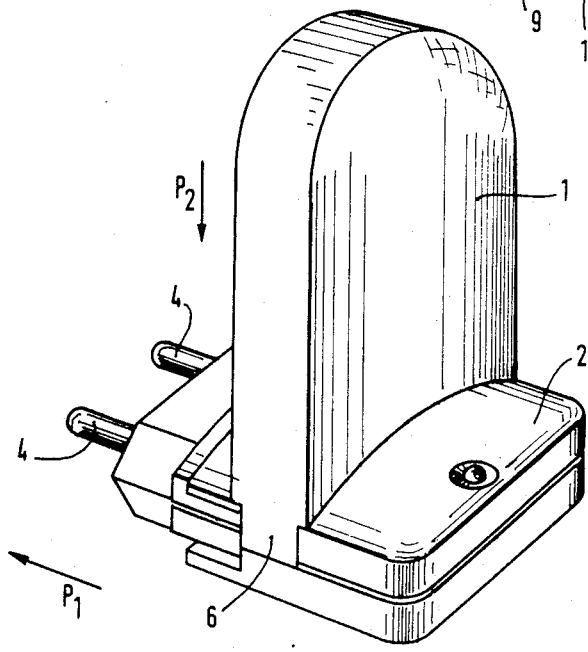
FIG. 3 shows the charging device of FIGS. 1 and 2 in the assembled position of the two sections during charging.

The charging device shown in FIGS. 1 to 3 comprises two sections 1 and 2 which can be assembled in two different positions relative to one another. In the closed condition shown in FIG. 1 the sections 1 and 2 are in the so-called rest position and FIG. 3 shows the sections in the so-called charging position.

Two rechargeable electric power sources, which are batteries 3 (FIG. 2), can be fitted into the first section 1. The second section 2 includes connector pins 4 and electric components, known per se, which generally include a transformer and a rectifier, not shown. These electric components are arranged as a charging circuit and are connected to contact faces 5 of section 2. These contact faces 5 are externally accessible.

In the position shown in FIG. 1, the section 1 does not contain batteries but the connector pins 4 of section 2 are covered by section 1. The longitudinal direction P1 (FIG. 2) of the connector pins 4 then corresponds to the longitudinal direction P2 of the batteries 3 when situated in section 1.

Section 1 is provided with slightly elastic limbs 6 whose ends carry inwardly directed projections 7. In the position shown in FIG. 1 the limbs 6 engage in corresponding recesses 8 (FIG. 2) on opposite sides of the second section 2, the projections 7 engaging recesses 9. In this way the two sections are snapped onto each other.

FIG. 2 shows the two sections 1 and 2 separated from each other, section 1 containing the batteries 3. The terminals of the batteries 3 are in contact with an electrical contact member 10. This contact member 10 also constitutes a flexible pressure member for the batteries 3 in the charging position shown in FIG. 3.

In the charging position shown in FIG. 3, the longitudinal direction P2 of the batteries extends transversely to the longitudinal direction P1 of the connector pins 4. By means of the recesses 11 and the recesses 12 on opposite sides in section 2 in cobination with the limbs 6 the sections 1 and 2 can also be snapped onto each other in this position. The terminals 13 of the batteries 3 are then in electrical contact with the charging circuit in section 2 via the contact faces 5 (FIG. 2). In this situation the electrical contact member 10 is deformed elastically and exerts the required contact pressure between the terminals 13 and the contact faces 5.

In this position the connector pins 4 are clear of section 1 and can be inserted directly into a mains socket, after which the batteries 3 will be charged.

By mounting section 1 transversely onto section 2, the distance between section 1 and the connector pins 4 is small in the position shown in FIG. 3. The weight of section 1 containing the batteries then exerts a small movement relative to the connector pins 4, so that the mechanical load to which the connector pins 4 are subjected when plugged into a mains socket is as favourable as possible.

This construction does not require a lead for connecting the charging device to the mains socket.

By giving the limbs 6 different widths and also giving the two pairs of recesses 8 and 11 corresponding to the respective limbs 6 different widths it is ensured that the first section 1 cannot be mounted onto the second section 2 in an incorrect charging position.

Figure 4:
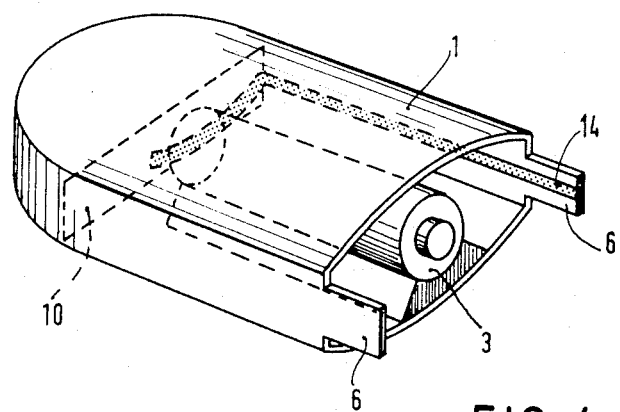
FIGS. 4 and 5 show modifications of the embodiment shown in FIGS. 1 to 3.

FIG. 4 shows a modification of the embodiment shown in FIGS. 1 to 3 and only shows section 1 of the charging device. Section 1 can now hold only one battery 3. An electrically conducting strip 14 is connected to the contact member 10 and extends up to one of the limbs 6. In the position shown in FIG. 3 this strip 14 is in contact with a corresponding contact face on section 2.

Figure 5:
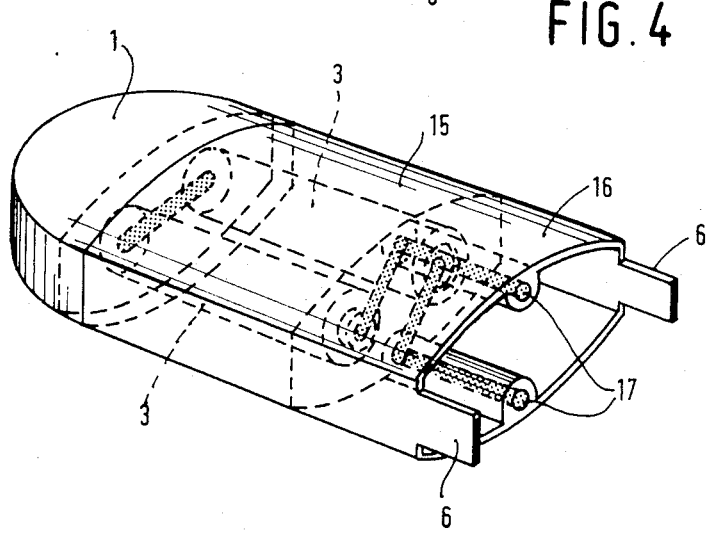

FIG. 5 shows another modification of the embodiment shown in FIGS. 1 to 3 and also shows section 1 only. This section 1 not only comprises a compartment 15 for the batteries 3 but also a compartment 16 for the connector pins 4, so that for the position of FIG. 1 the batteries need not be removed from section 1. Via electrical contact members 17 which are situated near the limbs 6 and which are in contact with the terminals of the batteries 3 it is again possible to establish a connection wtih the electric components in section 2 in the position shown in FIG. 3.

What is claimed is

1. A device for charging a rechargeable electric power source, which comprises a first section and a second section capable of being assembled in two positions relative to each other, one of said positions being a rest position and the other of said positions being a charging position, the first section being formed to receive a rechargeable electric power source; electric components arranged in said second section as a charging circuit for charging a rechargeable electric power source; connector pins provided on said second section for cooperating with an electric mains socket, said connector pins being connected to the electric components of the charging circuit; in the rest position the connector pins being covered by the first section; in the charging position the connector pins being clear of the first section and the rechargeable electric power source in the first section being electrically connected to the electric components of the charging circuit in the second section; and a flexible electrical contact member arranged in the first section for exerting pressure against the rechargeable electric power source.

2. A charging device according to claim 1, in which the second section is provided with an externally accessible contact face connected to the electric components of the charging circuit.

3. A charging device according to claim 2, in which in the charging position the external contact face is brought into direct contact with the rechargeable electric power source.

4. A charging device according to claim 1, in which the first section includes a compartment for the connector pins.

5. A charging device according to claim 1, in which the first section has two limbs with projections at their respective ends, and corresponding recesses are formed in the second section to provide a snapped connection between the two sections.

6. A charging device according to claim 5, in which the limbs have different widths, and the second section includes slots having widths respectively conforming with the widths of the limbs.

7. A charging device according to claim 1, in which in the rest position the longitudinal direction of the first section, corresponding to the longitudinal direction of the rechargeable electric power source, extends in the longitudinal direction of the connector pins, and in the charging position the longitudinal direction of the first section extends transversely to the longitudinal direction of the connector pins.

* * * * *